United States Patent
Schliwa et al.

(10) Patent No.: US 9,598,174 B2
(45) Date of Patent: Mar. 21, 2017

(54) VEHICLE LAVATORY

(71) Applicant: AIRBUS OPERATIONS GMBH, Hamburg (DE)

(72) Inventors: Ralf Schliwa, Dollern (DE); Maria Theresia Strasdas, Jork (DE); Florian Schüphaus, Hamburg (DE); Christian Seibt, Buchholz i.d. Nordheide (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 14/402,025

(22) PCT Filed: May 3, 2013

(86) PCT No.: PCT/EP2013/059246
§ 371 (c)(1),
(2) Date: Nov. 18, 2014

(87) PCT Pub. No.: WO2013/171077
PCT Pub. Date: Nov. 21, 2013

(65) Prior Publication Data
US 2015/0166180 A1 Jun. 18, 2015

Related U.S. Application Data

(60) Provisional application No. 61/648,788, filed on May 18, 2012.

(30) Foreign Application Priority Data

May 18, 2012 (EP) .................................... 12168570

(51) Int. Cl.
*B64D 11/02* (2006.01)
*B61D 35/00* (2006.01)
(Continued)

(52) U.S. Cl.
CPC .............. *B64D 11/02* (2013.01); *B60R 15/02* (2013.01); *B60R 15/04* (2013.01); *B61D 35/005* (2013.01);
(Continued)

(58) Field of Classification Search
CPC . B64D 11/02; B64D 11/04; B64D 2011/0046; A47K 1/00; A47K 11/00;
(Continued)

(56) References Cited

U.S. PATENT DOCUMENTS

D341,193 S 11/1993 Hart
6,007,025 A * 12/1999 Coughren et al. ......... 244/118.6
(Continued)

FOREIGN PATENT DOCUMENTS

CN 101678896 4/2008
CN 102428002 5/2010
(Continued)

OTHER PUBLICATIONS

International Search Report for PCT/EP2013/059246, mailed Aug. 5, 2013, 3 pages.
(Continued)

*Primary Examiner* — Christopher P Ellis
*Assistant Examiner* — Jessica Wong
(74) *Attorney, Agent, or Firm* — Nixon & Vanderhye P.C.

(57) ABSTRACT

A vehicle lavatory, in particular an aircraft lavatory, is described. The lavatory includes a cabin space with a centrally located vertical axis around which a washstand and a urinal unit are located. The washstand and urinal unit are arranged to each have an approximately horizontal surface at their top, such that a person using the lavatory has a location to place personal items during use. The horizontal surfaces of the washstand and the urinal are arranged to exist in the same plane and may be a continuous surface that may
(Continued)

additionally cross the entirety of the width of the cabin. The urinal is arranged such that a plane defining the opening of the urinal is at an angle relative to a plane defining a front surface of the washstand such that a person using the lavatory only has to turn slightly to access the urinal and the washstand.

14 Claims, 5 Drawing Sheets

(51) Int. Cl.
    *B63B 29/14*    (2006.01)
    *B60R 15/04*    (2006.01)
    *B60R 15/02*    (2006.01)
    *B64D 11/00*    (2006.01)

(52) U.S. Cl.
    CPC ...... *B63B 29/14* (2013.01); *B64D 2011/0046* (2013.01)

(58) Field of Classification Search
    CPC ....... B60R 15/02; B60R 15/04; B61D 35/005; B63B 29/14
    USPC ...................................................... 244/118.5
    See application file for complete search history.

(56) References Cited

U.S. PATENT DOCUMENTS

| | | | |
|---|---|---|---|
| 6,079,669 A * | 6/2000 | Hanay et al. | 244/118.5 |
| D458,355 S | 6/2002 | Tanner | |
| D501,675 S | 2/2005 | Iranyi | |
| D547,845 S | 7/2007 | Paterson | |
| 7,299,511 B2 * | 11/2007 | Quan | 4/670 |
| D619,229 S | 7/2010 | Kwak | |
| D701,948 S | 4/2014 | Schliwa et al. | |
| 9,139,302 B2 * | 9/2015 | Dehn | B64D 11/02 |
| 2002/0062521 A1 * | 5/2002 | Itakura | 4/664 |
| 2004/0163170 A1 | 8/2004 | Cooper et al. | |
| 2004/0227034 A1 * | 11/2004 | Wentland | B64D 11/02 244/119 |
| 2005/0230539 A1 * | 10/2005 | Quan | 244/118.1 |
| 2005/0241062 A1 * | 11/2005 | Quan | 4/664 |
| 2006/0150316 A1 * | 7/2006 | Fukuizumi et al. | 4/623 |
| 2012/0221192 A1 * | 8/2012 | Seibt | 701/29.1 |
| 2012/0261509 A1 * | 10/2012 | Grant et al. | 244/118.5 |
| 2015/0013063 A1 * | 1/2015 | Boodaghians | 4/663 |
| 2015/0048205 A1 * | 2/2015 | Seibt et al. | 244/118.5 |

FOREIGN PATENT DOCUMENTS

| | | |
|---|---|---|
| CN | 102431648 | 5/2012 |
| CN | ZL201230419519.5 | 3/2013 |
| DE | 10 2009 034 406 | 2/2011 |
| EM | 001317473-0001 | 9/2012 |
| EP | 2 431 233 | 3/2012 |
| EP | 2 664 542 | 11/2013 |
| JP | 6-040399 | 2/1994 |
| JP | 2008-6915 | 1/2008 |
| RU | 86732 | 10/2013 |
| WO | 2013/171077 | 11/2013 |

OTHER PUBLICATIONS

Written Opinion of the International Searching Authority for PCT/EP2013/059246, mailed Aug. 5, 2013, 4 pages.
Search Report for EP 12 16 5870 dated Nov. 12, 2012, 6 pages.
Chinese Office Action issued in related Chinese Application No. 201380025103.7, dated Jul. 27, 2015, (7 pages).

* cited by examiner

VEHICLE LAVATORY

CROSS-REFERENCE TO RELATED APPLICATION

This application is the U.S. national phase of International Application No. PCT/EP2013/059246 filed 3 May 2013, which designated the U.S. and claims priority to European Patent Application No. 12168570.5 filed 18 May 2012, and claims the benefit of U.S. Provisional Patent Application No. 61/648,788 filed 18 May 2012, the entire contents of each of which are hereby incorporated by reference.

BACKGROUND OF THE INVENTION

The present invention relates to a vehicle lavatory, in particular an aircraft lavatory, comprising a cabin and a urinal unit. The cabin has a circumferential wall surrounding a cabin interior space and defining a central vertical axis extending through said cabin interior space, wherein said circumferential wall includes an entrance wall section and a sanitary wall section spaced from said entrance wall section.

In vehicle construction and in particular in aircraft construction a permanent objective is to maximize the vehicle interior space intended for receiving passengers while reducing the vehicle interior space consumed by infrastructural facilities, such as lavatories, galleys or aisles. At the same time, the standard of comfort of these infrastructural facilities should be remained as high as possible in order to please the passengers. These both—generally conflicting—objectives are addressed by the present invention.

In order to reduce the space consumed by lavatories in aircraft construction and for comfort reasons ideas have come up to provide aircraft lavatories with a urinal. So far, lavatories comprising a urinal are considerably uncommon in aircraft construction, as lavatories merely comprising a urinal and no toilet may primarily be used by male passengers and lavatories comprising both toilet and urinal would be inefficient in view of desired low space consumption.

However, from DE 10 2009 034 406 A1 an aircraft lavatory is known which indeed comprises both a toilet and a urinal, wherein the associated lavatory cabin may be expanded or shrunk depending on the specific application, such that in the expanded state enough space for both toilet and urinal is provided. The aircraft lavatory disclosed in DE 10 2009 034 406 A1 is formed by an expandable cabin comprising a circumferential wall having an entrance wall section and a sanitary wall section.

It appears that the space consumed by aircraft lavatories can be reduced in a reasonable manner by replacing two adjacent lavatories each including a toilet by one lavatory including a toilet and one lavatory including a urinal instead of a toilet. A lavatory including a urinal instead of a toilet may be formed with a reduced width compared to a lavatory including a toilet, as the urinal unit is less space consuming. However, in order to gain a considerable benefit from such lavatory arrangement, for example by including an additional row of seats into the passenger cabin, the interior space of the lavatory which includes the urinal has to be substantially smaller, i.e. the floor area of the interior space has to be substantially narrower, than of the lavatory including a toilet. The lavatory arrangement known from DE 10 2009 034 406 A1 cannot be sufficiently reduced in size so as to fulfil these requirements, even if the toilet would be left out.

BRIEF SUMMARY OF THE INVENTION

Therefore, it is the object of the present invention to overcome aforementioned drawbacks. In particular, the technical problem should be solved to provide a vehicle lavatory, preferably an aircraft lavatory, having a urinal unit, which lavatory is formed in such a manner that the space consumption, in particular the width of the floor area, may be reduced as far as possible, whereas at the same time a high comfort standard and use value of the lavatory can be maintained.

These objects are achieved by a vehicle lavatory in particular an aircraft lavatory, comprising a cabin having a circumferential wall surrounding a cabin interior space and defining a central vertical axis extending through said cabin interior space, wherein said circumferential wall includes an entrance wall section and a sanitary wall section spaced from said entrance wall section, a washstand unit extending from said sanitary wall section into said cabin interior space, wherein said washstand unit comprises a washstand top plate extending perpendicularly to said central vertical axis, wherein said washstand unit further comprises a washbasin arranged in said washstand top plate, and a urinal unit extending from said sanitary wall section into said cabin interior space, wherein said urinal unit comprises a urinal having a urinal opening, wherein said urinal opening faces said central vertical axis and defines a urinal opening plane. Such an arrangement consumes only a small amount of space and provide for a sufficiently high comfort standard. Moreover, the lavatory according the present invention can be used for other purpose like changing clothes or putting up make-up.

Preferably the urinal opening plane is inclined with respect to a horizontal urinal top surface to allow easier access for the user.

Furthermore, it is preferred when the urinal top surface extends in the plane of said washstand top plate and that the upper end of the urinal opening is arranged below the urinal top surface. In this way the urinal top surface and the washstand top plate together form a common surface which can be used by the passengers for laying down their personal belongings during washing and which provides for a generous appearance of the washbasin and the entire washstand. Said common surface preferably comprises a common material and look.

In another preferred embodiment the washstand top plate has a washstand front edge opposite to said sanitary wall section, wherein the urinal opening plane is arranged in such a manner that a horizontal line which is perpendicular to the central vertical axis and extends in the urinal opening plane, is inclined with respect to said washstand front edge. Thus, the urinal entire front of the urinal is inclined with respect to the front of the washstand so that a user can use either the washstand or the urinal from a sole standing position, which reduces the width of the cabin to a minimum. Meanwhile, the urinal is arranged entirely below said top surface and framed in a urinal side panel extending from said urinal top surface downwards and parallel to said central vertical axis. The urinal may be formed as a vacuum urinal which extracts the urine from the urinal interior by vacuum suction. The washstand unit also comprises a washstand side panel extending from said washstand top plate downwards and parallel to the central vertical axis and forming a continuous transition to the urinal side panel.

Therefore, by the washstand unit and the urinal unit an overall washstand is formed which provides a wide common top surface including a washbasin and represented by the washstand top plate and the urinal top surface, which has a common side panel including the urinal opening and represented by the washstand side panel and the urinal side panel, and which is divided into the washstand unit and the urinal unit only by a vertical confine extending between both units. According to the present invention the urinal may be incorporated into said overall washstand, i.e. the overall washstand side panel, wherein the urinal can be arranged in close proximity to the washbasin without limiting the extend of the common overall washstand top surface, i.e. the washstand top plate and the urinal top surface.

Preferably, the distance between the center of the urinal opening and the center of the washbasin when being measured in a plane perpendicular to said central vertical axis is between 340 mm and 500 mm, more preferably between 400 mm and 440 mm, and most preferably 418 mm. In this way, a user of the lavatory may use the washbasin and the urinal from a single standing position and switch between the use of the washbasin and the urinal, respectively, by merely turning the body about an angle which corresponds to the angle between a horizontal line which is perpendicular to the vertical axis and extends in the urinal opening plane, and the washstand front edge.

By arranging the urinal and the washbasin in such close proximity the space consumed by the washstand unit and the urinal unit and therefore the width of the lavatory cabin, measured horizontally between the two side walls, may be reduced to such an extent, preferably of about 68,6 cm (27 inches), that enough space for introducing a further row of seats into the passenger cabin is obtained, while at the same time the user of the lavatory has sufficient space to comfortably use both the washbasin and the urinal and finds a wide and uninterrupted washstand surface for e.g. laying down personal belongings during washing.

The sanitary wall section may be a plane vertical wall section essentially parallel or perpendicular to the entrance wall section and perpendicular to at least one side wall section. However, the sanitary wall section may also be curved, e.g. about a horizontal axis perpendicular to the side wall sections, so as to extend in such a way to be adapted to the aircraft outer skin. The washstand unit including the washstand top plate and the urinal unit including the urinal top surface preferably extend along the entire horizontal distance of the sanitary wall section from one side wall to the opposite side wall.

The washstand front edge extending on the side of the washstand top plate opposite to the sanitary wall and between the washstand top plate and the washstand side panel may in certain embodiments of the invention extend in a curved manner in a horizontal plane. In such cases, the urinal opening plane is arranged in such a manner that a horizontal line which is perpendicular to said vertical axis and extends in said urinal opening plane, is inclined with respect to a horizontal tangent to that point of the washstand front edge having the largest distance to the sanitary wall section, i.e. the most forward point of the front edge.

The application of the vehicle lavatory according to the present invention is not limited to the mere use of the urinal. Rather, it may be used for various purposes, such as for washing hands, face, or body, changing clothes, putting up makeup, or changing diapers of a baby. It may be used not only by male but also by female passengers, and to increase further the value (urinal acceptance of female pax) of the lavatory according to the present invention, a unisex urinal design adaption is conceivable. In particular, as the dimensions of the lavatory are such that a user has sufficient space to move inside the cabin, the lavatory according to the present invention can be used for the afore-mentioned purposes.

The present invention may be employed particularly as an aircraft lavatory but may of course be applied in other vehicles, such as trains or busses.

According to a preferred embodiment the urinal opening is arranged such that a vertical tangent plane to the lower end of the urinal opening intersects said washstand front edge at the center of the washbasin or at that side of said center that is remote form the urinal unit. Such an arrangement of the urinal unit with respect to the washstand unit leads to a particular proximity and angle of the washbasin and the urinal opening which are advantageous in view of a desired low width of the lavatory cabin.

In a further preferred embodiment said entrance wall section extends opposite to said sanitary wall section, in particular the entrance wall section and the sanitary wall section are spaced and extend essentially parallel. Such an arrangement is generally preferred, wherein the entrance wall section includes an entrance door extending essentially parallel to said sanitary wall section and perpendicular to the side wall sections. In such a way, a user of the lavatory finds the washstand and the urinal strait ahead, when entering the lavatory cabin which represents the most convenient lavatory design. Usually, the sanitary wall section points towards the aircraft outer skin such that the lavatory cabin can be entered from the aisle sidewards.

In an alternative preferred embodiment said entrance wall section extends perpendicularly to the sanitary wall section. Such an arrangement is also possible and may be employed, when the lavatory cabin is intended to be entered in longitudinal direction of the fuselage, e.g. when the lavatories are disposed on the very front or on the very rear of the aisle or in the center of the fuselage.

According to a preferred embodiment said washstand unit and said urinal unit are formed and arranged such that each can be removed independently from said sanitary wall section. That means each of the washstand unit and the urinal unit may be connected to and disconnected from the sanitary wall section independently from one another, and none the washstand unit and the urinal unit is allowed to block the other from being removed from the sanitary wall. Such a design helps to easily exchange one of both units e.g. for maintenance or upgrade reasons. Further, each unit can be manufactured separately e.g. by separate manufacturers.

According to another preferred embodiment said urinal unit further comprises a dispenser device accommodated in the space between an upper urinal panel extending upwards from said urinal top surface, and the sanitary wall section. As above the urinal no washbasin is provided which usually requires space deeply to the sanitary wall, the space above the urinal, i.e. upwards from the urinal top surface, is free for use by a dispenser device, for example a paper towel dispenser, which is disposed between the upper urinal panel and the sanitary wall section. Slots are provided in the upper urinal panel so as to extract the paper towels. Further, a paper towel bin may be provided in the same space between the upper urinal panel and the sanitary wall section, also having a slot in the upper urinal panel for accessing the bin. The upper urinal panel may extend straight in a vertical plane and essentially parallel to the sanitary wall section or the urinal side panel or the washstand side panel. Alternatively, the upper urinal panel may be inclined, such that in upwards direction it extends increasingly into the cabin interior space.

In particular, it is preferred that the washstand unit comprises an upper washstand panel extending upwards from said washstand top plate between said washbasin and said sanitary wall section and that the distance between said upper urinal panel and the sanitary wall section is larger than the distance between the upper washstand panel and the sanitary wall section, the distances being measured in the plane of said urinal top surface and said washstand top plate. By means of the upper urinal panel and the upper washstand panel the sanitary wall section is covered to the cabin interior space in the area upwards from the washstand top plate and the urinal top surface, respectively. The upper washstand panel is disposed closer to the sanitary wall section than the upper urinal panel so as to provide a certain free space above the washbasin, so that a user of the washbasin may bend over the washbasin during washing without hitting his head. The upper urinal panel may be disposed further away from the sanitary wall than the upper washstand panel in order to receive the dispenser device between the upper urinal panel and the sanitary wall section.

In another preferred embodiment the urinal opening plane is arranged in such a manner that the horizontal line which is perpendicular to the central vertical axis and extends in the urinal opening plane is inclined with respect to said washstand front edge by an angle of between 30° and 65°, preferable between 40° and 56°, most preferably of 48°. Such an arrangement of the washstand unit and the urinal unit is particularly advantageous, as both the washbasin and the urinal may be used from a single standing position of a user which merely has to turn his body by the same angle as included between the horizontal line which is perpendicular to the central vertical axis and extends in the urinal opening plane and the washstand front edge, in order to switch between the urinal and the washbasin or washstand. At the same time, such an arrangement of urinal unit and washstand unit permits the closest possible distance of the side wall sections to one another, i.e. the lowest possible width of the lavatory cabin.

In yet another preferred embodiment a table member is pivotally mounted to a side wall section extending from said sanitary wall section, such that said table member is pivotal between a use position, wherein it extends parallel to and is supported by said urinal top surface and wherein it covers the urinal opening, and a store position, wherein it extends parallel to said side wall section. According to the invention, side wall sections to which the table member is mounted do not have to be exactly perpendicular to the sanitary wall section but may also extend within a range of angles close to the perpendicular position with respect to the sanitary wall section.

The table member may be mounted to the side wall section by means of hinges. Its size and shape is adapted such that it entirely covers the urinal opening in vertical direction and that it forms an extension of the surface represented by the washstand top plate and the urinal top surface along the side wall member, thereby forming an L-shape together with the washstand top plate and the urinal top surface. Preferably, the table member is mounted to that side wall section which is next to the urinal unit. The table member further be formed in such a way that it allows to be used as a diaper changing table, wherein in the use position it extends along the side wall and into the cabin interior space only to such an extend that a passenger using the table member, e.g. for changing the diapers of a baby, has enough space to comfortably stand and move along the edge of the table member. For this reason, it is also preferred that the edge of the table member pointing in the direction of the cabin interior room and the central vertical axis, respectively, has a rounded down shape.

According to a further embodiment a lid element is pivotally mounted to the urinal by means of a hinge element, wherein the lid element and the hinge element are formed and arranged in such a way that the lid element is pivotal between a closed position in which it entirely covers the urinal opening, and an opened position in which the urinal opening is entirely uncovered. In particular, it is preferred that the hinge element is mounted to the urinal on that side of the urinal opening that is closest to the washstand unit. Providing of a lid element in order to cover the urinal opening is advantageous for two major reasons. Firstly, unpleasant smell and appearance of the urinal as well as germs escaping from the urinal interior can be inhibited by the lid element in the closed position, when the lavatory is used for other issues but for using the urinal, e.g. for washing hands, changing cloths, putting up makeup, or changing a baby's diapers. Secondly, the during use of the urinal squirting of urine to the washstand unit, in particular to the washstand top plate is inhibited by the lid element in the opened position, thereby guaranteeing a possibly high standard of hygiene.

It is also preferred that mirror elements are provided on one or more, most preferably on all four wall section, i.e. the entrance wall section, the sanitary wall section and the two side wall sections.

In the following, two preferred embodiments of the present invention are described in detail by means of a drawing. The drawing shows in

DETAILED DESCRIPTION OF THE INVENTION

Figure 1:
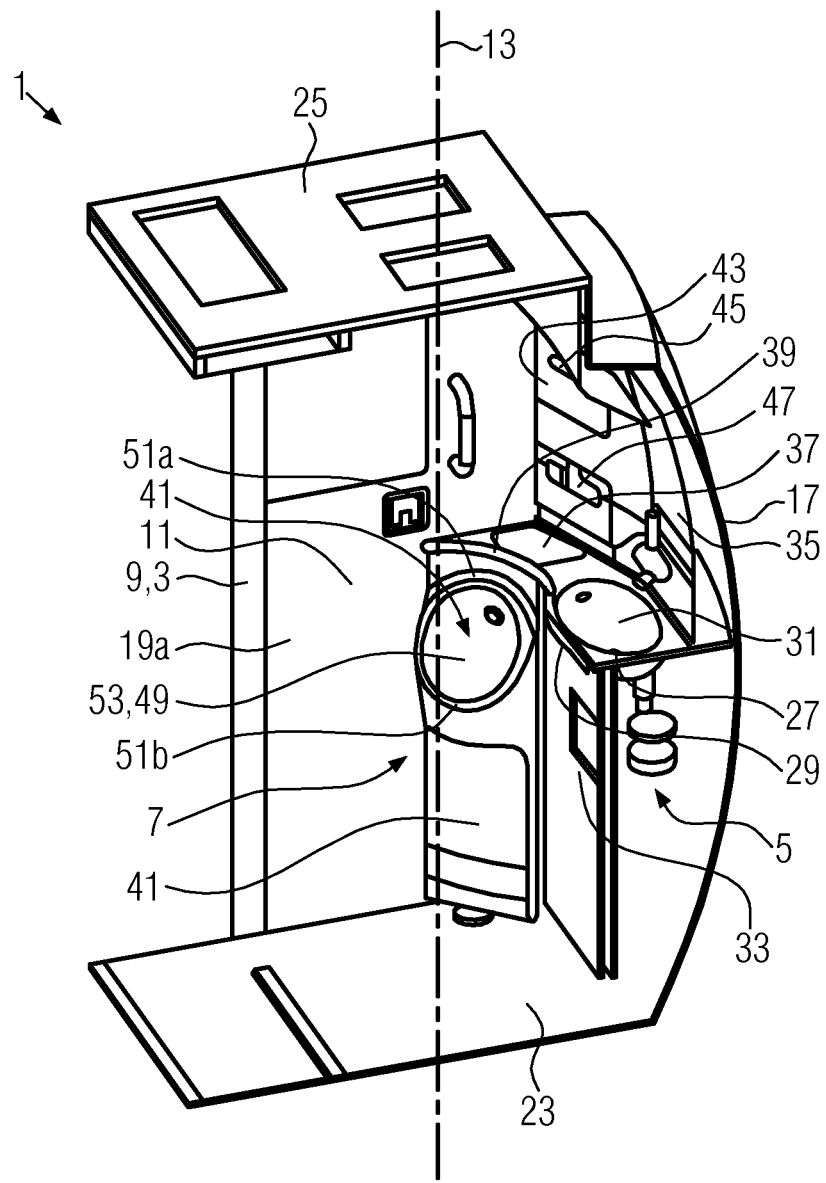
FIG. 1 a perspective view of a first embodiment of the vehicle lavatory according to the present invention, having a curved washstand front edge, FIG. 2 a top view of the embodiment shown in FIG. 1, FIG. 3 a top view of a second embodiment of the vehicle lavatory according to the present invention, having a straight washstand front edge, FIG. 4 a top view of the embodiment illustrated in FIG. 3, showing a passenger using the washbasin, FIG. 5 a top view of the embodiment illustrated in FIG. 3, showing a passenger using the table member.
Figure 2:
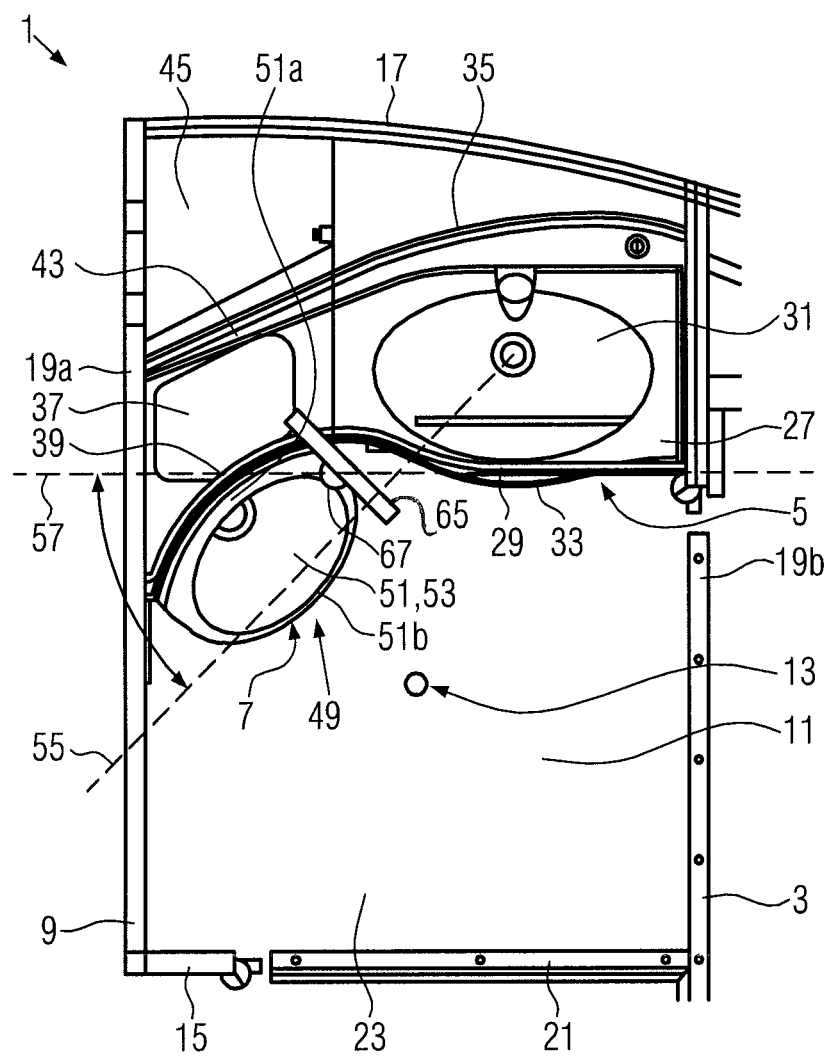

In FIGS. 1 and 2 a first embodiment of a vehicle lavatory 1 according to the present invention is illustrated wherein this embodiment is adapted to be used in an aircraft. However, the invention is not limited to such a use of the lavatory but can be employed in buses or other vehicles.

The vehicle lavatory 1 comprises a cabin 3, a washstand unit 5, and a urinal unit 7. The cabin 3 has a circumferential wall 9 defining a cabin interior space 11 which extends about a central vertical axis 13 perpendicularly to the floor of the cabin. The circumferential wall 9 has an entrance wall section 15 (hidden in FIG. 1, see FIG. 2), a sanitary wall section 17 opposite to the entrance wall section 15, and two side wall sections 19*a*, 19*b* perpendicular to said entrance wall section 15 and said sanitary wall section 17, i.e. parallel to one another. The entrance wall section 15 includes an entrance door 21 for entering and exiting the cabin 3. The entrance wall section 15 and the two side wall sections 19*a*, 19*b* extend parallel with respect to the central vertical axis 13, and the sanitary wall section 17 extends slightly curved about a horizontal axis perpendicular to the side wall sections 19*a*, 19*b* in order to e.g. fit to an aircraft outer skin. The cabin further has a bottom wall 23 and a ceiling wall 25 both extending parallel to one another. The bottom wall 23 and the ceiling wall 25 further extend essentially perpendicularly to the circumferential wall 9 and the central vertical axis 13. Additionally, mirror elements may be arranged on the sanitary wall section 17, the entrance wall section 15, and/or the two side wall sections 19a, 19b.

The washstand unit 5 is disposed on the sanitary wall section and extends from there into the cabin interior space 11. The washstand unit 5 includes a washstand top plate 27 which extends horizontally, i.e. perpendicularly to the central vertical axis 13, and which has a washstand front edge 29 extending along the washstand top plate 27 remote from the sanitary wall section 17.

According to the first embodiment of the invention the washstand front edge 29 extends with respect to a horizontal plane in a curved manner along the washstand top plate 27. The washstand unit 5 further comprises a washbasin 31 arranged in the washstand top plate 27 having a tap and a drain. Below the washstand top plate 27 the washstand unit 5 has a washstand side panel 33 which extends in parallel to said central vertical axis 13 and essentially perpendicularly to the side wall sections 19a, 19b. Above the washstand top plate 27 the washstand unit 5 has an upper washstand panel 35 which extends from the washstand top plate 27 upwards. The upper washstand panel 35 may be slightly curved in order to fit to the sanitary wall section 17.

The urinal unit 7 is disposed adjacent to the washstand unit 5 on the sanitary wall section 17 and extends from said sanitary wall section 17 into the cabin interior space 11. The urinal unit 7 includes a urinal top surface 37 which extends in the same plane as the washstand top plate 27, thereby together with said washstand top plate 27 forming a common horizontal overall surface 27, 37 extending from one side wall section 19a to another side wall section 19b.

The urinal top surface 37 has a urinal front edge 39 remote from the sanitary wall section 17 which in a horizontal plane extends in a curved manner, such that a portion of the urinal top surface 37 extends along the side wall 19a in a direction away from the sanitary wall section 17. Below the urinal top surface 37 the urinal unit 7 has a urinal side panel 41 extending essentially parallel to said central vertical axis 13. Above the urinal top surface 37 the urinal unit 7 comprises an upper urinal panel 43 which extends from the urinal top surface 37 upwards in a vertical plane. Between the upper urinal panel 43 and the sanitary wall section 17 a free space is provided in which a dispenser device 45, e.g. a paper towel dispenser, is accommodated together with a paper towel bin 47. Slots are provided in the upper urinal panel 43 in order to access the dispenser 45 and the bin 47.

The urinal unit 7 further comprises a urinal 49 having a urinal opening 51 extending in a urinal opening plane 53, said urinal 49 being arranged below the urinal top surface 37 in such a way that the urinal opening 51 is framed in the urinal side panel 41, wherein the upper end 51a of the urinal opening 51 extends below the urinal top surface 37. The urinal 49 may be constructed as a vacuum urinal.

The urinal 49 is formed and orientated such that the urinal opening 51 faces the central vertical axis 13 and the ceiling wall 25, wherein the urinal opening plane 53 is inclined in such a manner that between a horizontal line 55 perpendicular to the central vertical axis 13 and extending in said urinal opening plane 53 and a tangent 57 to a point on the washstand front edge 29 having the largest distance to the sanitary wall section 17, an angle of 48° is spanned (see FIG. 2). The point through which the tangent extends, is also the most forward point of the front edge which is closest to the entrance wall section 15.

In this preferred embodiment an angle of 48° was chosen resulting in a lavatory arrangement which has small dimensions but is still particularly comfortable for a user. However, to achieve these effects the angle between the washstand front edge 29 and the tangent, respectively, on the one hand and the horizontal line 55 on the other may be between 30° and 65°, and preferably between 40° and 56°.

Further, the urinal unit 7 comprises a lid element 65 which is pivotally mounted to the urinal 49 by means of a hinge element 67, such that the lid element 65 can be pivoted between a closed position in which the urinal opening 51 is entirely covered by the lid element 65, and an opened position in which the urinal opening 51 is entirely uncovered by the lid element 65. The hinge element 67 is mounted to the urinal 49 on that side of the urinal opening 51 which is closest to the washstand unit 5, in particular to the washstand top plate 27, so that the lid element 65 in the opened position protects the washstand unit 5 from squirting urine, and in the closed position inhibits uncomfortable smell or germs from escaping the urinal 49 interior and provides for a more pleasant appearance of the urinal unit 7.

Both the washstand unit 5 and the urinal unit 7 are formed and arranged in such a way that each may be removed from the sanitary wall section 17 independent from the other. Although both units 5, 7 are disposed on the sanitary wall section 17 adjacent to one another, each unit 5, 7 can be slid in or out of a fixed position at the sanitary wall section 17 and adjacent the other one 7, 5, and without the other one 7, 5 needs to be moved for this reason.

Figure 3:
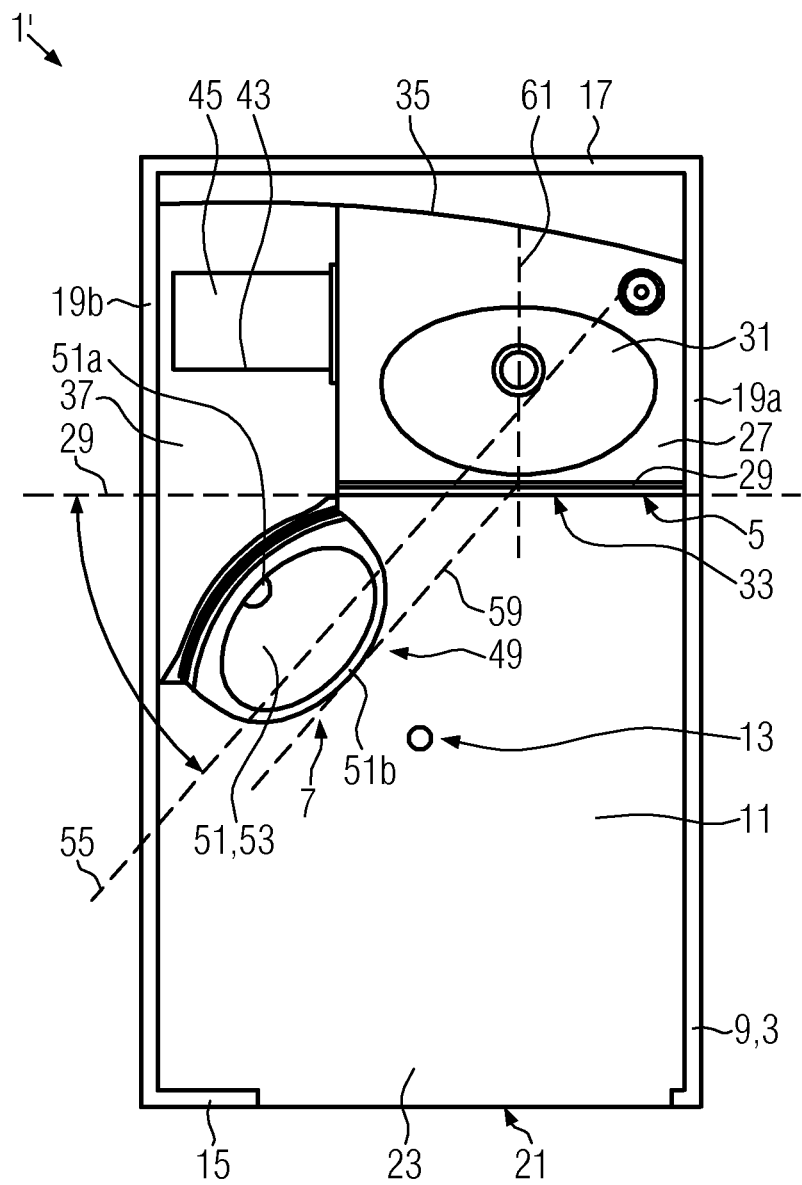
Figure 4:
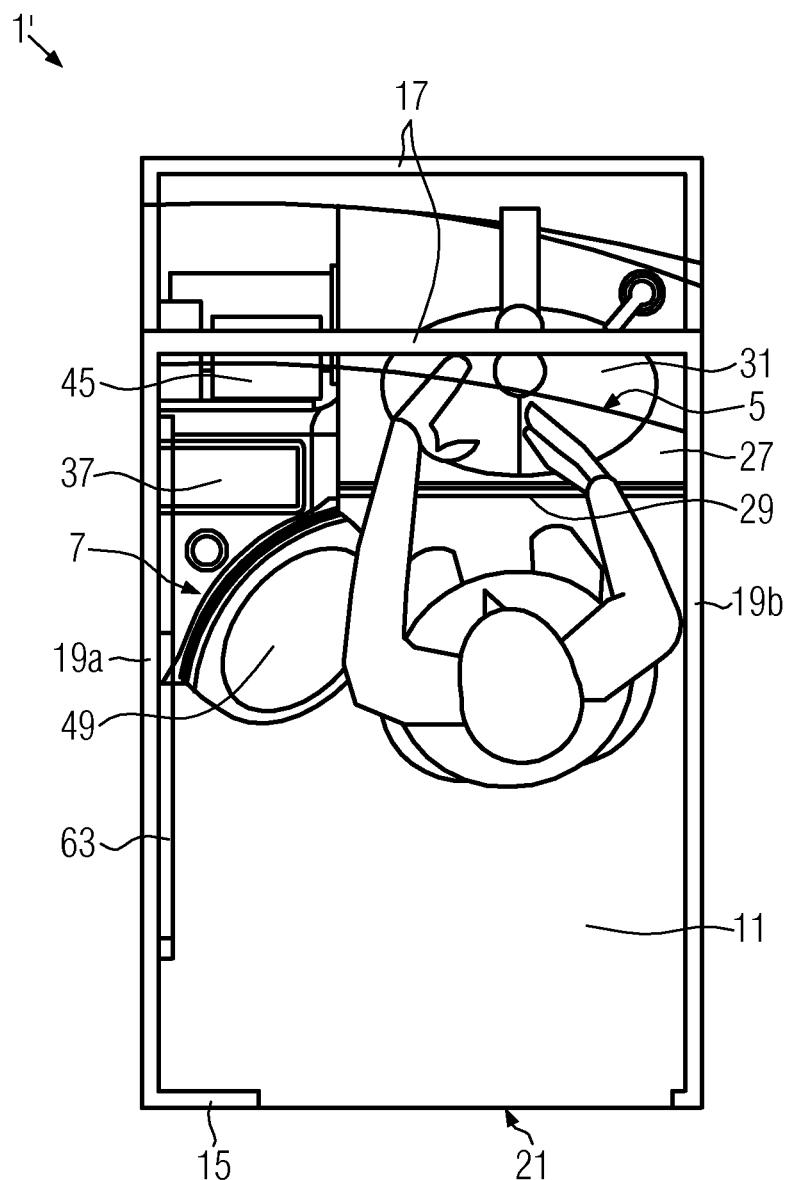
Figure 5:
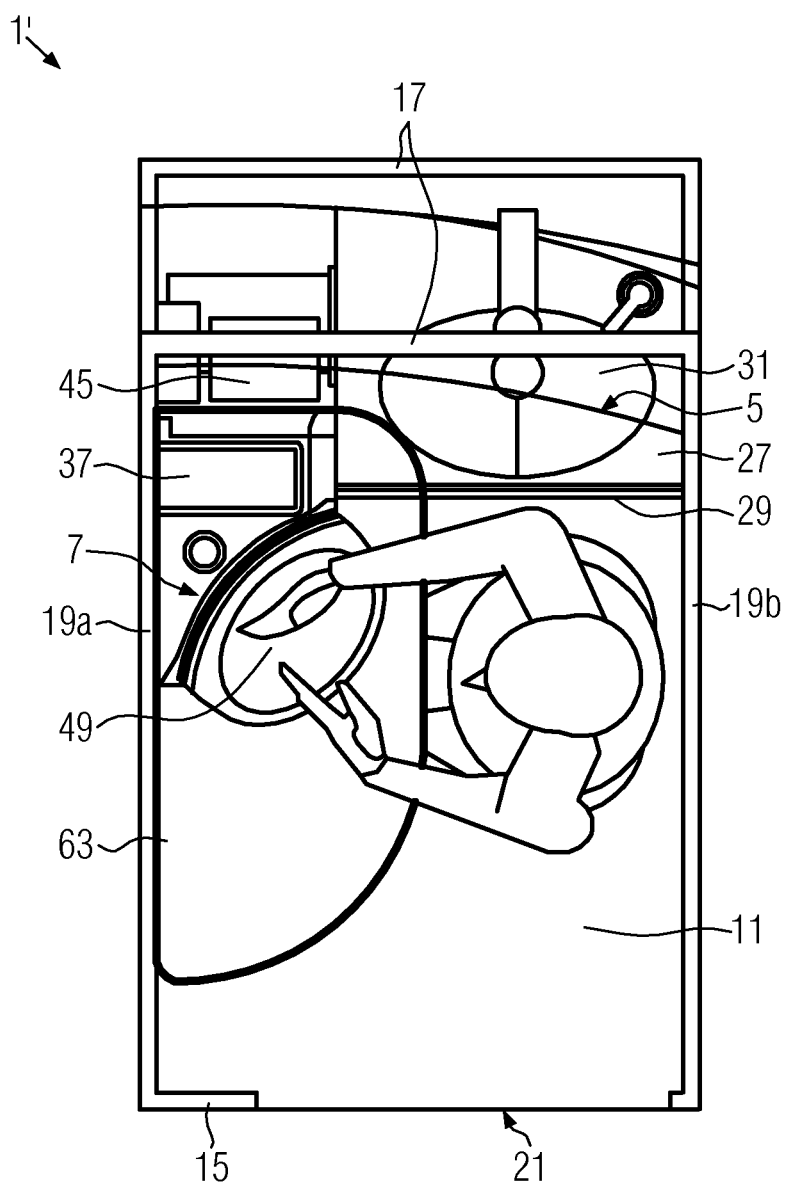

A second embodiment of a vehicle lavatory 1' according to the present invention is illustrated in FIG. 3 to FIG. 5. As the second embodiment differs from the first embodiment only in few minor features, in both embodiments similar features are indicated by same reference numerals.

The second embodiment of the vehicle lavatory 1' comprises a cabin 3 having a circumferential wall 9, a washstand unit 5 having a washstand top plate 27 including a washbasin 31, and a urinal unit 7 having a urinal 49 including a urinal opening 51 entirely disposed below a urinal top surface 37, said urinal top surface 37 in turn extending in the same plane as the washstand top plate 27.

The second embodiment of the vehicle lavatory 1' differs from the first embodiment by the washstand front edge 29 in a horizontal plane not being curved but extending straight and perpendicular to the side wall sections 19a, 19b. Thus, according to the second embodiment the angle of 48° is not measured between a horizontal line 55 extending in the urinal opening plane 53 and a tangent 57 to a point on the washstand front edge 29 which is closest to the entrance wall section 15, but between said horizontal line 55 and said straight washstand front edge 29 itself.

Further, as shown in FIG. 3, the urinal unit 7 and the washstand unit 5 are arranged to one another in such a way that a vertical tangent plane 59 to the lower end of the urinal opening 51b intersects the washstand front edge 29 at the center 61 of the washbasin 31 or at that side of the center 61 remote from the urinal unit 7.

In this embodiment, a table member 63 is pivotally mounted to that side wall section 19a which is adjacent to the urinal unit 7. The table member 63 can be pivoted between a use position and a store position. In the store position the table member 63 is parallel to the side wall section 19a and abuts the side wall section 19a, and in the use position the table member 63 extends perpendicularly to the side wall section 19a and abuts a portion of the urinal top surface 37 by which it is supported (illustrated in FIG. 5).

The table member 63 may be used for example as diaper changing table as well as for expanding the available storage surface during washing provided by the washstand top plate 27 and the urinal top surface 37.

By the arrangement of the lavatory 1, 1' according to either embodiment described before, it becomes possible to reduce the cabin width by a considerable amount, i.e. to a width of about 68,6 cm (27 inches), measured between the two side walls along the bottom wall. At the same time, the comfort which the lavatory 1, 1' provides for a user is still satisfyingly high. A user finds enough space in the cabin 3 to comfortably use the washbasin 31, the urinal 49, or the table member 63 without even needing to change the standing position (see FIGS. 4 and 5). Only a change of angular orientation is required, when switching from e.g. the urinal 49 to the washbasin 31. The scope of application of the currently described lavatory 1, 1' ranges from using the urinal 49, washing hands, face or body, changing cloths, putting up make-up, and changing a baby's diapers, and is not limited to the male gender.

The invention claimed is:

1. An aircraft lavatory comprising:
a cabin having a circumferential wall surrounding a cabin interior space and defining a central vertical axis extending through said cabin interior space, wherein said circumferential wall includes an entrance wall section and a sanitary wall section spaced from said entrance wall section;
a washstand unit extending from said sanitary wall section into said cabin interior space, wherein said washstand unit comprises a washstand top plate extending perpendicularly to the central vertical axis to create a surface configured to support at least personal items placed thereon, wherein said washstand unit further comprises a washbasin arranged in said washstand top plate, wherein said washstand unit comprises a front edge facing said cabin interior space and a rear edge opposite said front edge; and
a urinal unit extending from said sanitary wall section into said cabin interior space, wherein said urinal unit comprises a urinal having a urinal opening and a urinal top surface, wherein said urinal unit comprises a rear edge opposite said urinal,
wherein said urinal opening faces said central vertical axis and defines a urinal opening plane, the urinal top surface is perpendicular to said central vertical axis and extends in a common plane with said washstand top plate, and an upper end of the urinal opening below the urinal top surface,
wherein the entire rear edge of said washstand unit extends along the sanitary wall section, and wherein the entire rear edge of said urinal unit extends along the sanitary wall section, and
wherein said washstand unit and said urinal unit are formed and arranged such that each can be removed independently from said sanitary wall section.

2. The lavatory according to claim 1, wherein said urinal opening plane is inclined with respect to the urinal top surface.

3. The lavatory according to claim 1, wherein said washstand top plate has a washstand front edge opposite to said sanitary wall section, and wherein said urinal opening plane is arranged in such a manner that a horizontal line which is perpendicular to said central vertical axis and extends in said urinal opening plane, is arranged at an angle relative to said washstand front edge.

4. The lavatory according to claim 1, wherein the urinal top surface and said washstand top plate form a continuous surface.

5. The lavatory according to claim 3, wherein the urinal opening is arranged such that a vertical tangent plane to the lower end of the urinal opening intersects said washstand front edge at the center of the washbasin or at a location on the washstand front edge that is farther from the urinal unit than the center of the washbasin.

6. The lavatory according to claim 1, wherein said entrance wall section extends opposite to said sanitary wall section.

7. The lavatory according to claim 1, wherein said entrance wall section extends perpendicularly to said sanitary wall section.

8. The lavatory according to claim 1, wherein said urinal unit further comprises a dispenser device accommodated in the space between an upper urinal panel extending upwards from the urinal top surface and the sanitary wall section.

9. The lavatory according to claim 1, wherein the washstand unit comprises an upper washstand panel extending upwards from said washstand top plate between said washbasin and said sanitary wall section and that the distance between an upper urinal panel and the sanitary wall section is larger than the distance between the upper washstand panel and the sanitary wall section, said distances being measured in the plane of said urinal top surface and said washstand top plate.

10. The lavatory according to claim 3, wherein the urinal opening plane is arranged in such a manner that the horizontal line which is perpendicular to the central vertical axis and extends in the urinal opening plane, is angled relative to said washstand front edge by an angle in a range of 30° to 65°.

11. The lavatory according to claim 1, wherein a table member is pivotally mounted to a side wall section extending from said sanitary wall section, such that said table member is pivotal between a use position, wherein it extends parallel to and supported by said urinal top surface and wherein it covers the urinal opening, and a store position, wherein it extends parallel to said side wall section.

12. The lavatory according to claim 1, wherein a lid element is pivotally mounted to the urinal by means of a hinge element, wherein the lid element and the hinge element are formed and arranged in such a way that the lid element is pivotal between a closed position in which it entirely covers the urinal opening, and an opened position in which the urinal opening is entirely uncovered.

13. The lavatory according to claim 12, wherein the hinge element is mounted to the urinal on that side of the urinal opening that is closest to the washstand unit.

14. An aircraft lavatory comprising:
a cabin within a fuselage of an aircraft and including a circumferential wall surrounding a cabin interior space and defining a central vertical axis extending through said cabin interior space, wherein the circumferential wall includes an entrance wall section and a sanitary wall section spaced from the entrance wall section;
a washstand unit extending from the sanitary wall section into the cabin interior space and detachable from the sanitary wall section, wherein the washstand unit includes a washstand top plate extending horizontally towards the central vertical axis and a washbasin in the washstand top plate, wherein said washstand unit comprises a front edge facing said cabin interior space and a rear edge opposite said front edge, and a urinal unit including a urinal opening facing the vertical axis and a urinal top surface above an upper edge of the urinal opening, wherein the urinal top surface is in a common plane with the washstand top plate, the urinal unit extends from the sanitary wall section into the cabin interior space, wherein said urinal unit comprises a rear edge opposite said urinal, wherein the urinal unit is detachable from the sanitary wall section separately from the washstand unit, wherein the entire rear edge of said washstand unit extends along the sanitary wall section, and wherein the entire rear edge of said urinal unit extends along the sanitary wall section.

\* \* \* \* \*